Patented Sept. 7, 1937

2,092,724

UNITED STATES PATENT OFFICE 2,092,724

ALKYL-CHLORO-HYDROXY-DIPHENYLS

Edgar C. Britton, Gerald H. Coleman and Lindley E. Mills, Midland, Mich., assignors to The Dow Chemical Company, Midland, Mich., a corporation of Michigan No Drawing. Application August 20, 1936, Serial No. 97,014

14 Claims. (Cl. 260—154)

The present invention concerns a new class of compounds, namely, the alkyl chloro-hydroxy-diphenyls.

We have prepared compounds of the aforementioned class, determined certain physical properties thereof whereby they may be readily identified, and found that they are particularly useful as microbicides, antiseptics, preservatives, intermediates, etc. These compounds are, for the most part, viscous, high-boiling, water-white liquids, substantially insoluble in water but somewhat soluble in dilute aqueous alkaline solutions and most organic solvents.

The preparation of our new compounds can be accomplished by the direct chlorination of an alkyl-hydroxy-diphenyl. For example, an alkyl-hydroxy-diphenyl, such as 4-normal-propyl-2-hydroxy-diphenyl, is warmed to a temperature at which the substituted phenol is sufficiently fluid to be stirred, and chlorine introduced below the surface thereof until the desired degree of chlorination has been accomplished. If desired, inert solvents, such as chlorobenzene, ethylene dichloride, carbon tetrachloride, etc., may be employed as solvents for the alkyl-hydroxy-diphenyl compound; and chlorination catalysts, such as metallic iron, iron chloride, iodine, etc., may be employed, although not necessarily. Following completion of the chlorination step, dissolved hydrogen chloride is removed from the reaction mixture, which is then fractionally distilled to isolate the desired reaction product.

These new compounds can also be prepared by reacting a chloro-hydroxy-diphenyl compound with an olefine, an alkyl halide, or an aliphatic alcohol, in the presence of suitable catalysts, such as aluminum chloride, aluminum bromide, iron chloride, zinc chloride, tonsil, etc. For example, a chloro-hydroxy-diphenyl compound, such as 3-chloro-2-hydroxy-diphenyl, is warmed to a suitable temperature, usually between about 75° and about 175° C., and the olefine, alkyl halide, etc., slowly added below the surface of the liquid reaction mixture with stirring. The reaction mixture is thereafter heated and stirred until the condensation is complete, i. e. until hydrogen chloride is no longer evolved. After the reaction is completed, the crude alkylated mixture is washed with dilute aqueous hydrochloric acid to decompose and remove residual catalyst, and the desired products separated, e. g. by fractional distillation in vacuo, etc.

Among other methods by which the compounds may be prepared are (1) by partial hydrolysis of suitable alkyl dihalo-diphenyl derivatives, e. g. 2-tertiary-butyl-4.4'-dichloro-diphenyl, 2.3-dichloro-5-normal-amyl-diphenyl, 3-chloro-4-bromo-5-normal-propyl-diphenyl, etc.; (2) by diazotization of the alkylated chloro-amino-diphenyls, e. g. 2-isopropyl-4-amino-6-chloro-diphenyl, 2-amino-4-methyl-6-chloro-diphenyl, etc., and decomposition of the resulting diazonium compounds with aqueous alkali; (3) by the esterification of the chloro-hydroxy-diphenyls with aliphatic organic acids, rearrangement of such esters with anhydrous aluminum chloride, and reduction of the resulting ketonic bodies.

The following examples describe in detail the preparation of certain individual members of our new class of compounds, but are not to be construed as limiting the invention:

*Example 1.—3-chloro-4-hydroxy-5-isopropyl-diphenyl*

A mixture of 205 grams (1 mole) of 3-chloro-4-hydroxy-diphenyl and 8 grams (0.06 mole) of finely divided anhydrous aluminum chloride (AlCl$_3$) was heated to a temperature of 95° C., and 160 grams (2 moles) of 2-chloropropane was slowly introduced, with stirring, below the surface of the reaction mixture at a substantially uniform rate over a period of 3.5 hours, during which time the temperature of reaction was gradually increased to 115° C. Thereafter the reaction mixture was maintained for one hour at 115° C. with stirring, washed with dilute aqueous hydrochloric acid to remove catalyst, and fractionally distilled under vacuum, the yield being 136 grams (0.54 mole) of a 3-chloro-4-hydroxy-5-isopropyl-diphenyl product. This compound is a viscous, water-white liquid boiling at 145°–148° C. at 2 millimeters pressure and having a specific gravity of 1.12 at 20°/4° C.

*Example 2.—2-hydroxy-3-isopropyl-5-chloro-diphenyl*

In a similar manner 205 grams (1 mole) of 2-hydroxy-5-chloro-diphenyl, 80 grams (1 mole) of 2-chloropropane, and 4 grams (0.03 mole) of anhydrous aluminum chloride were reacted together, thereby yielding 135 grams (0.54 mole) of an isopropyl chloro-hydroxy-diphenyl product. 2-hydroxy-3-isopropyl-5-chloro-diphenyl is a viscous, water-white liquid boiling at 142°–144° C. at 2 millimeters pressure and having a specific gravity of 1.127 at 20°/4° C.

*Example 3.—Isopropyl-chloro-3-hydroxy-diphenyl*

163 grams (0.795 mole) of a mixture of the isomeric mono-chloro-3-hydroxy-diphenyls, boiling at 130°–140° C. at 2 millimeters pressure, 64 grams (0.8 mole) of 2-chloro-propane, and 4 grams (0.03 mole) of anhydrous aluminum chloride were reacted together substantially as described in Example 1. Fractional distillation of the crude reaction product resulted in the isolation of 28 grams of a mixture of the isomeric isopropyl-mono-chloro-3-hydroxy-diphenyls, as a viscous, water-white oil boiling at 155°–165° C. at 2 millimeters pressure, having a specific gravity of 1.138 at 20°/4° C. and containing on analysis 13.6 per cent by weight of chlorine, which corresponds closely to theoretical.

Example 4

A mixture of 36 grams of ethylated 2-hydroxy-diphenyl, boiling at approximately 185° C. at 15 millimeters pressure, and 0.01 gram of ferric chloride was warmed to 55° C., and 21.3 grams (0.3 mole) of chlorine slowly passed thereinto over a period of 1.5 hours. At the end of this time the reaction product was blown with air to remove residual dissolved hydrogen chloride therefrom, and fractionally distilled under reduced pressure, whereby there was obtained 20.5 grams of a chlorinated ethyl-2-hydroxy-diphenyl product, boiling at 157° to 160° C. at 5 millimeters pressure, and having a specific gravity of 1.268 at 20°/4° C., containing 22.5 per cent by weight of combined chlorine.

Example 5.—2-hydroxy-3-chloro-5-secondary-butyl-diphenyl 75 grams (0.332 mole) of 2-hydroxy-5-secondary-butyl-diphenyl, boiling at 160°–167° C. at 6 millimeters, and 0.25 gram of anhydrous ferric chloride were dissolved in 475 grams of carbon tetrachloride, and 27 grams (0.38 mole) of gaseous chlorine reacted therewith over a period of 1.15 hours at a temperature of 33°–45° C. The reacted mixture was thereafter blown with air to remove dissolved hydrogen chloride and the carbon tetrachloride separated therefrom by distillation at atmospheric pressure. The residue was fractionally distilled, thereby obtaining 82.5 grams (0.317 mole) of 2-hydroxy-3-chloro-5-secondary-butyl-diphenyl, which is a water-white, viscous liquid boiling at 151°–154° C. at 2 millimeters pressure and having a specific gravity of 1.135 at 20°/4° C. This product contained 13.97 per cent by weight chlorine by analysis, which corresponded closely to theoretical.

Example 6.—2-hydroxy-3-chloro-5-tertiary-butyl-diphenyl 75 grams (0.332 mole) of 2-hydroxy-5-tertiary-butyl-diphenyl, boiling at 133°–135° C. at 3 millimeters pressure, was dissolved in 475 grams of carbon tetrachloride, and chlorine gas passed thereinto, substantially as described in Example 5. Fractionation of the crude reaction product yielded 81.5 grams of 2-hydroxy-3-chloro-5-tertiary-butyl-diphenyl, a water-white, viscous liquid boiling at 160°–165° C. at 2 millimeters pressure, having a specific gravity of 1.138 at 20°/4° C. and containing 13.4 per cent by weight chlorine as compared to the theoretical content of 13.6 per cent.

Example 7.—2-hydroxy-3-chloro-5-tertiary-hexyl-diphenyl

In a similar manner 75 grams (0.295 mole) of tertiary-hexyl-ortho-phenylphenol, boiling at 180°–184° C. at 7 millimeters pressure, was chlorinated in 475 grams of carbon tetrachloride. 82 grams (0.283 mole) of the desired mono-chlorinated derivative was obtained upon fractional distillation of the crude reaction product. 2-hydroxy-3-chloro-5-tertiary-hexyl-diphenyl is a water-white, viscous oil boiling at 157°–159° C. at 2 millimeters pressure and having a specific gravity of 1.090 at 20°/4° C.

The mixed reaction product formed in the foregoing examples may advantageously be utilized as antiseptics, etc., without separating therefrom the individual alkyl-chloro-hydroxy-diphenyl constituents. Such mixtures are viscous, high-boiling liquids, soluble in dilute aqueous and alcoholic alkaline solutions and most organic solvents.

In a similar manner other alkyl-chloro-hydroxy-diphenyl compounds may be prepared. For example, by the chlorination of the corresponding alkyl-hydroxy-diphenyl compounds, 2-hydroxy-3-normal-amyl-5-chloro-diphenyl, 2-methyl-4-hydroxy-5-chloro-diphenyl, 2-isopropyl-3.5-dichloro-4-hydroxy-diphenyl, 3-hydroxy-4-chloro-6-tertiarybutyl-diphenyl, 2-hydroxy-3-chloro-5-octyl-diphenyl, etc. are prepared.

Similar compounds in which chlorine is attached to the non-hydroxylated benzene ring, result from (1) the alkylation of compounds such as 4-hydroxy-4'-chloro-diphenyl, 2-hydroxy-3.4'-dichloro-diphenyl, etc., to form mono- and di-alkyl derivatives thereof, and (2) the direct chlorination of the alkyl-hydroxy-diphenyls in the presence of a suitable catalyst such as iron chloride, iodine, antimony pentachloride, etc. The chlorination of compounds having alkyl substituents in the non-hydroxylated benzene ring gives compounds such as 3.5-dichloro-4-hydroxy-4'-methyl-diphenyl, and 2-hydroxy-5-chloro-4'-isopropyl-diphenyl, which are included within the scope of this invention.

Other modes of applying the principle of our invention may be employed instead of those explained, change being made as regards the materials employed, provided the products described in the following claims be thereby obtained.

We therefore particularly point out and distinctly claim as our invention:

1. An alkyl-chloro-hydroxy-diphenyl in which the alkyl and chloro-substituents are attached to the hydroxylated benzene ring.

2. An alkyl-chloro-hydroxy-diphenyl in which at least one alkyl group and one chlorine are attached to the hydroxylated benzene ring.

3. A mono-alkyl-chloro-hydroxy-diphenyl in which the alkyl group is attached to the hydroxylated benzene ring and contains not more than 8 carbon atoms.

4. A mono - alkyl - monochloro - hydroxy - diphenyl in which the alkyl group and chlorine are attached to the hydroxylated benzene ring.

5. A mono - alkyl - monochloro - hydroxy - diphenyl in which the alkyl group contains not more than 8 carbon atoms and is attached to the hydroxylated benzene ring.

6. A mono - alkyl - monochloro - hydroxy - diphenyl in which the alkyl group contains not more than 8 carbon atoms and the alkyl and chloro-substituents are attached to the hydroxylated benzene ring.

7. Mono - alkyl - monochloro- 2 -hydroxy - diphenyl.

8. Mono - propyl - monochloro - hydroxy - diphenyl.

9. Mono - propyl - monochloro - 2 - hydroxy-diphenyl.

10. Mono - butyl - monochloro - hydroxy - diphenyl.
11. Mono - butyl - monochloro - 2 - hydroxy-diphenyl.
12. Isopropyl-monochloro-hydroxy-diphenyl.
13. 2-hydroxy-3-chloro-5-isopropyl-diphenyl.
14. 2 - hydroxy- 3 -chloro-5-tertiary-butyl-diphenyl.

EDGAR C. BRITTON.
GERALD H. COLEMAN.
LINDLEY E. MILLS.